US007619391B2

(12) United States Patent
Loong

(10) Patent No.: US 7,619,391 B2
(45) Date of Patent: Nov. 17, 2009

(54) ELECTRICAL APPLIANCE WITH BATTERY PROTECTION

(75) Inventor: Chiu Keung Loong, Shau Kei Wan (KR)

(73) Assignee: Defond Components Limited, Hong Kong SAR (CN)

( * ) Notice: Subject to any disclaimer, the term of this patent is extended or adjusted under 35 U.S.C. 154(b) by 378 days.

(21) Appl. No.: 11/551,268

(22) Filed: Oct. 20, 2006

(65) Prior Publication Data

US 2007/0126407 A1 Jun. 7, 2007

Related U.S. Application Data

(60) Provisional application No. 60/728,336, filed on Oct. 20, 2005.

(51) Int. Cl.
*H02J 7/00* (2006.01)

(52) U.S. Cl. ........................................................ 320/134

(58) Field of Classification Search ................. 320/134; 318/434; 388/903; 361/90, 101
See application file for complete search history.

(56) References Cited

U.S. PATENT DOCUMENTS

| | | | | |
|---|---|---|---|---|
| 6,992,463 | B2 * | 1/2006 | Yoshio | 320/134 |
| 7,508,171 | B2 * | 3/2009 | Carrier et al. | 320/138 |
| 2003/0096158 | A1 * | 5/2003 | Takano et al. | 429/90 |
| 2005/0242779 | A1 * | 11/2005 | Yoshio | 320/134 |

* cited by examiner

*Primary Examiner*—Edward Tso
*Assistant Examiner*—Ramy Ramadan
(74) *Attorney, Agent, or Firm*—Leydig, Voit & Mayer, Ltd.

(57) ABSTRACT

An electrical appliance, such as a power tool, has an electrical motor, a control circuit connected to the motor, and a rechargeable LI-ion battery pack for powering the motor via the control circuit. A battery protection circuit has a detection circuit for detecting an adverse operating condition of the battery pack and then providing a disabling signal indicative of that condition. Also included is an interface circuit provided between the battery circuit and the control circuit for sending said disabling signal to the control circuit to switch off the motor.

11 Claims, 10 Drawing Sheets

| | SW1 | SW2 | SW3 |
|---|---|---|---|
| BRAKE | ON | OFF | / |
| RUNNING | OFF | ON | / |
| FORWARD | / | / | POS1 |
| REVERSE | / | / | POS2 |

ELECTRICAL APPLIANCE WITH BATTERY PROTECTION

The present invention relates to an electrical appliance with battery protection and to, particularly but not exclusively, an electrical power tool that uses a Li-ion (Lithium ion) battery pack.

BACKGROUND OF THE INVENTION

The battery pack, which usually incorporates a battery protection/power management circuit, may take an independent form so that it can be detached for recharging or for replacement, or it may be an integrated or built-in component so that it is cannot be removed.

In general, Li-ion batteries are used in battery packs that contain both lithium ion battery cells and battery protection/management circuits. For user replaceable battery packs, both items are enclosed in a container which is usually made of a plastics material so that the battery pack cannot easily be disassembled. The battery protection electronics may be sealed with a material such as resin. For battery packs which are not designed to be replaced by end users, they are integrated within the tools or appliance. One of the major functions of the protection circuit is to avoid the LI-ion battery cells discharging at a voltage below a threshold voltage, such as 3.0 V per cell, because over-discharging may damage or downgrade the performance (i.e. capacity) of the battery pack.

Traditionally, at least one MOSFET (i.e. metal oxide semiconducter field-effect transistor) is integrated in a Li-ion battery pack for protecting the Li-ion battery cells from over-discharging.

The electrical output to an appliance or power tool will be cut off or reduced through the MOSFET integrated in the battery pack when the battery management electronics detect an adverse operating condition that may cause problems to the battery such as over-discharging. This will be accomplished by cutting the power either through the positive battery terminal B+ for a P-channel MOSFET or the negative battery terminal B− for an N-channel MOSFET.

This traditional way of battery protection is however expensive. Moreover, the heat generated/dissipated by the MOSFET by current passing through it may heat up and hence damage or deteriorate the battery cells inside the battery pack.

The invention seeks to mitigate or to at least alleviate such a problem by providing a new or otherwise improved electrical appliance.

SUMMARY OF THE INVENTION

According to a first aspect of the invention, there is provided an electrical appliance comprising an electrical load for operation to enable the electrical appliance to perform a specific function, a control circuit connected to the load for controlling the operation of the load, and a rechargeable battery device for supplying electrical power to the load via the control circuit. A battery circuit comprises a detection circuit for detecting an adverse operating condition of the battery device and then providing a disabling signal indicative of said adverse operating condition. Also included is an interface circuit provided between the battery circuit and the control circuit for sending said disabling signal to the control circuit to cause the control circuit to stop the load drawing electrical power from the battery device.

Preferably, the control circuit comprises a solid-state switching device connected in series with the load.

More preferably, the switching device comprises a metal oxide semiconducter field-effect transistor.

It is preferred that the control circuit includes a controller for operating the switching device.

It is further preferred that the interface circuit is provided between the battery circuit and the controller for delivering said disabling signal to the controller to cause the controller to turn off the switching device to stop the load drawing electrical power from the battery device.

Preferably, the battery device comprises a lithium ion battery cell.

More preferably, the detection circuit is adapted to detect over-discharging of the lithium ion battery cell as said adverse operating condition.

In a preferred embodiment, the battery circuit includes a switching element for controlling connection between a battery cell of the battery device and the battery circuit, and the control circuit includes a sensing circuit for sensing start of operation of the load and then providing an enabling signal to the battery circuit for the switching element to connect the battery cell to the battery circuit for operation.

More preferably, the interface circuit includes a link extending across the battery circuit and the control circuit for sending said disabling signal from the battery pack to the control circuit and for sending said enabling signal from the control circuit to the battery pack.

The interface circuit may include two said links, one for sending said disabling signal from the battery pack to the control circuit and the other for sending said enabling signal from the control circuit to the battery pack.

It is preferred that the electrical appliance is a power tool including a motor as the electrical load.

It is further preferred that the control circuit includes a pull-trigger operating a switch to control the operation of the motor.

According to a second aspect of the invention, there is provided an electrical appliance comprising an electrical load for operation to enable the electrical appliance to perform a specific function, a solid-state switching device connected with the load for controlling the operation of the load, a controller for operating the switching device, and a rechargeable battery device for supplying electrical power to the load via the switching device. A battery protection circuit comprises a detection circuit for detecting an adverse operating condition of the battery device and for providing a disabling signal indicative of said adverse operating condition. Also included is a signal circuit connected between the battery protection circuit and the controller for sending said disabling signal to the controller to cause the controller to turn off the switching device to stop the load drawing electrical power from the battery device.

BRIEF DESCRIPTION OF DRAWINGS

The invention will now be more particularly described, by way of example only, with reference to the accompanying drawings, in which.

DETAILED DESCRIPTION OF PREFERRED EMBODIMENTS

Referring initially to FIGS. 3 to 9 of the drawings, there is shown a first electrical appliance embodying the invention, which takes the form of an electric hand drill incorporating an electric motor 10 for rotation to drive a chuck holding a drill bit, for example, to enable the drill to perform a drilling function. The motor 10 represents an electrical load in the system. It draws electrical power from a rechargeable battery pack 200 for operation, under the control of a motor control/switching circuit 100.

As part of the control circuit 100, a pull-trigger on the body of the drill controls the operation of the motor 10 by means of a solid-state switching device, which is a MOSFET 110, and a mechanical main switch SW2 connected in series with the MOSFET 110 between the motor 10 and the battery pack 200 for controlling the power supplied to the motor 10. While the main switch SW2 is being closed by pulling the pull-trigger, the MOSFET 110 switches on and off to deliver an adjustable pulsating DC current via the main switch SW2 to the motor 10 for rotation at a desired speed/torque, or to stop. A brake switch SW1 is optionally connected in parallel with the motor 10 for swift, regenerative braking.

The main and brake switches SW2 and SW1 are operated by respective moving contacts slidable by the pull-trigger, being closed and opened as appropriate dependent upon the trigger position i.e. the position of the pull-trigger. More specifically, the main switch SW2 will be closed immediately upon pulling of the pull-trigger, and the brake switch SW1 will be closed when the pull-trigger is released to return to its outermost home position under the action of an internal spring (FIG. 5).

Figures 5, 6:
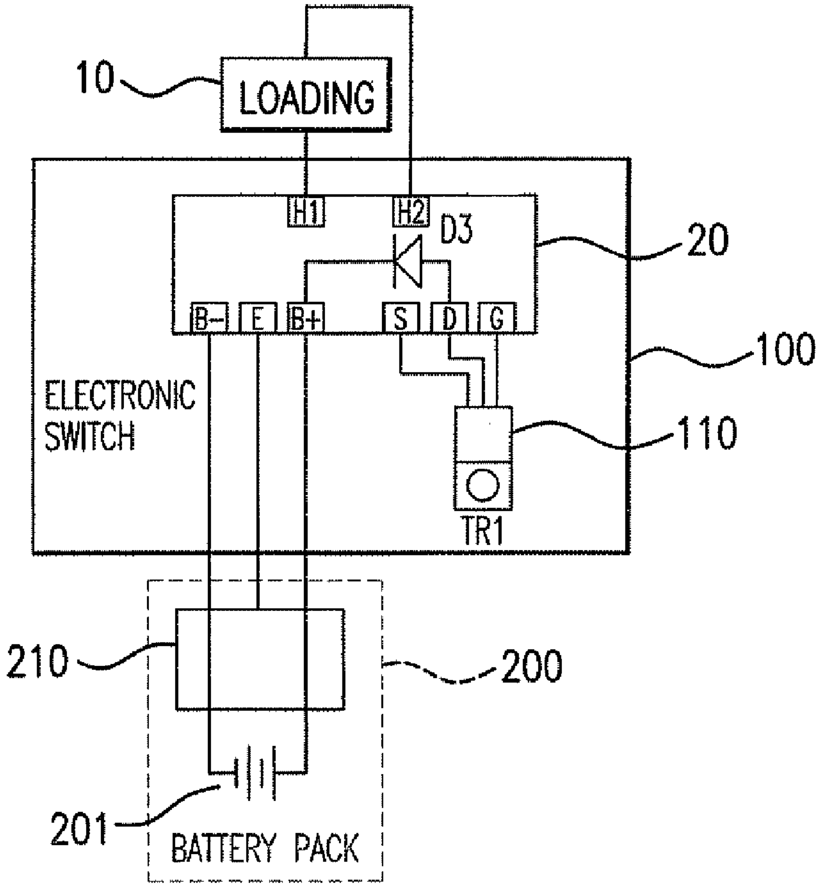
FIG. 5 is a table listing out various modes of operation of the appliance of FIG. 4 relative to the status of certain switches thereof.
FIG. 6 is a general representation of the appliance of FIGS. 3 and 4.
Figure 7:
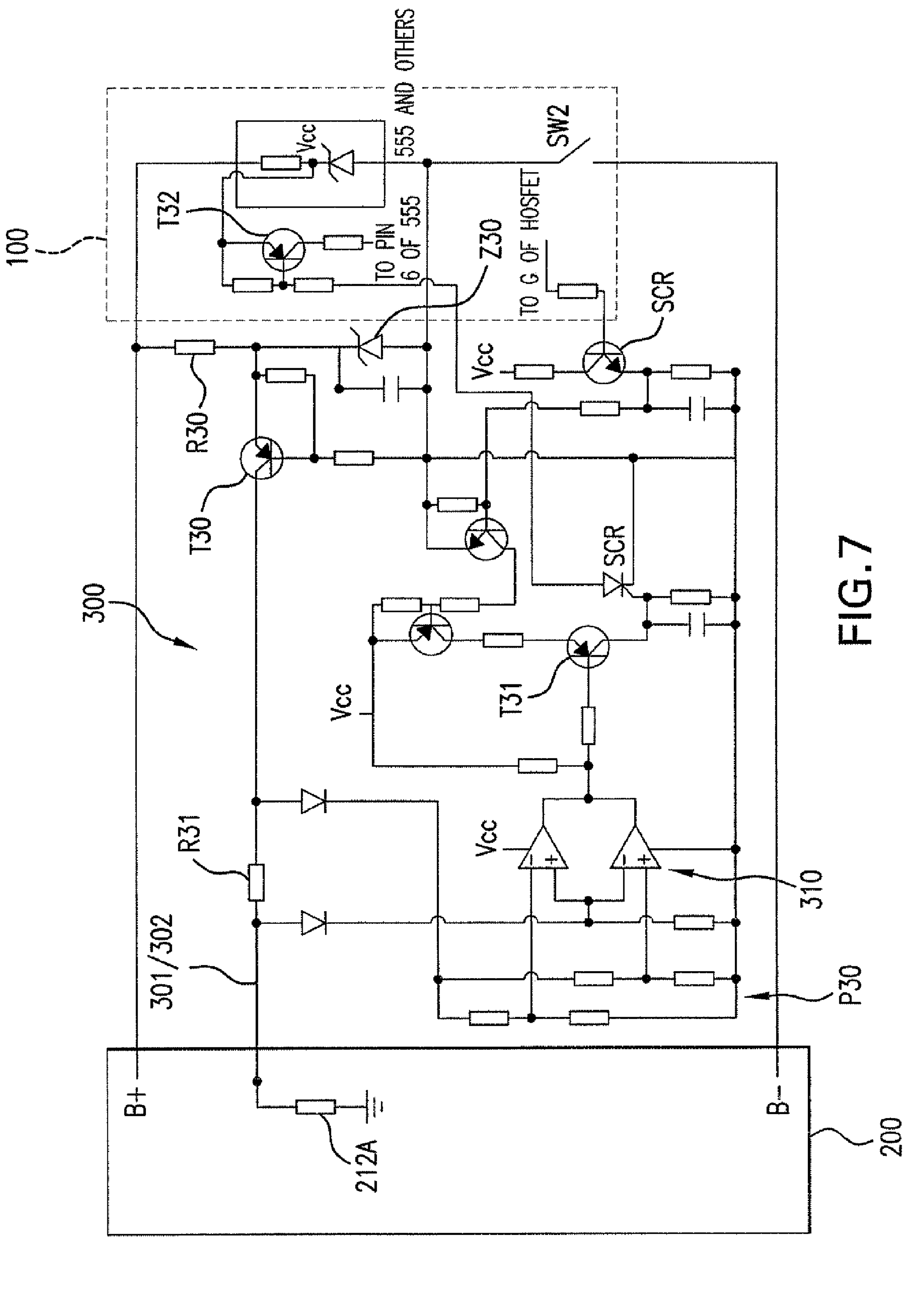
FIG. 7 is a circuit diagram of an interface circuit of the electrical appliance of FIG. 1, provided between the load control circuit and the battery circuit.

A reverse circuit, incorporating a 2P-2T switch SW3 and a diode D3, connects the MOSFET 110 to the motor 10 in the opposite direction for reversing the current driving the motor 10 and hence its direction of rotation (FIG. 5). On the contrary, the reverse switch SW3 is a separate switch for independent manual operation as required.

The control circuit 100 includes a control unit 120 that is built based on an integrated circuit IC chip 20 (such as NE555 timer IC) for generating a control signal at a frequency of several 100 Hz up to 10 kHz to turn on and off the MOSFET 110 for operation at that frequency, while the main switch SW2 is closed. The IC CHIP 20 has an output pin 3 connected to the MOSFET 110, a pair of input pins 2 and 6, and a discharge pin 7 for a capacitor C2 connected to both input pins 2 and 6.

Also included in the control circuit 100 is a variable resistor unit acting as an output selector 130 which is mechanically associated with the pull-trigger for operation thereby. In operation, the output selector 130 adjusts the pulse width or mark-to-space ratio of the control signal, i.e. by way of pulse width modulation (PWM), at the output pin 3 of the IC CHIP 20 and in turn the root-mean-square (rms) value of the pulsating DC current from the battery pack 200 flowing through the MOSFET 110 for driving the motor 10 at a corresponding speed/torque.

The output selector 130 is also operated by a moving contact 30 slidable by the pull-trigger, which is connected to both input pins 2 and 6 of the IC CHIP 20. The output selector 130 includes a series of eight resistors R1 to R8 connected in series on a printed circuit board, with their junctions connected to a row of co-parallel inclined contact strips on the circuit board for successive sliding contact by the moving contact 30 as it is being slid by the pull-trigger. The outer ends of the two resistors R1 and R8 at opposite ends of the series are connected to the discharge pin 7 of the IC CHIP 20 via a pair of diodes D1 respectively.

Figure 1:
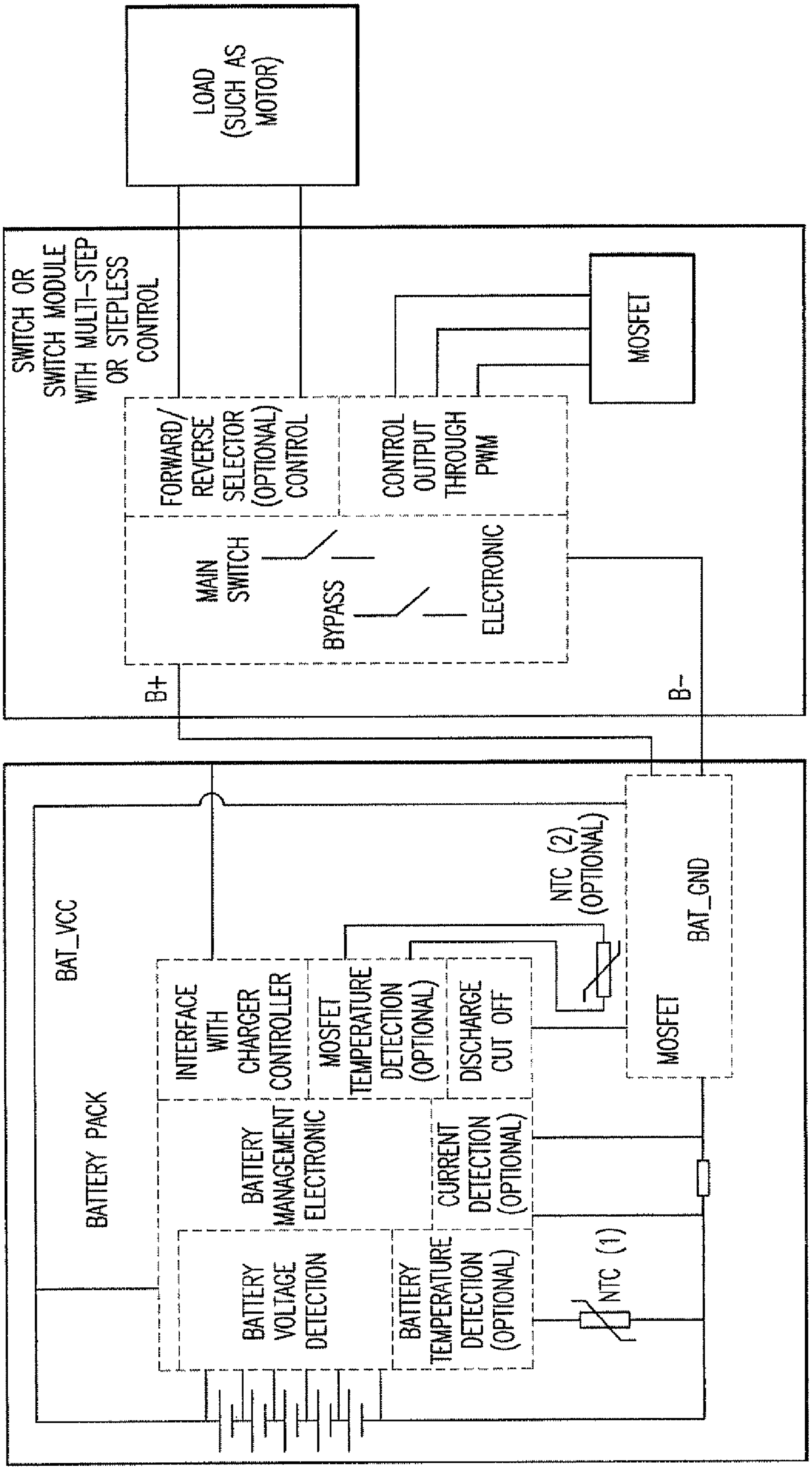
FIG. 1 PRIOR ART
FIGS. 1 and 2 are functional block diagrams that illustrate the traditional way of preventing battery over-discharging by using a built-in MOSFET in the battery pack.
Figure 2:
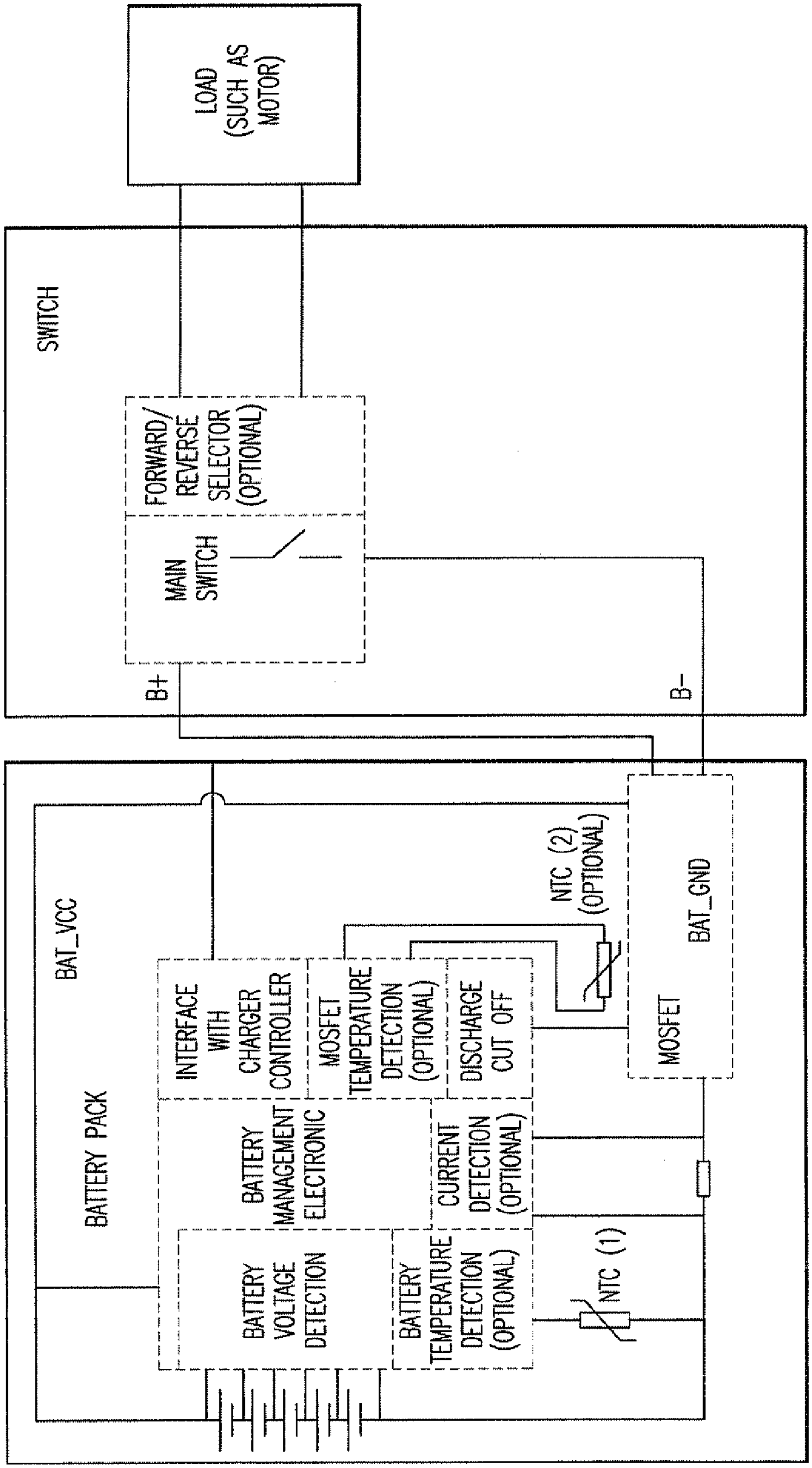
FIG. 2 PRIOR ART
Figure 3:
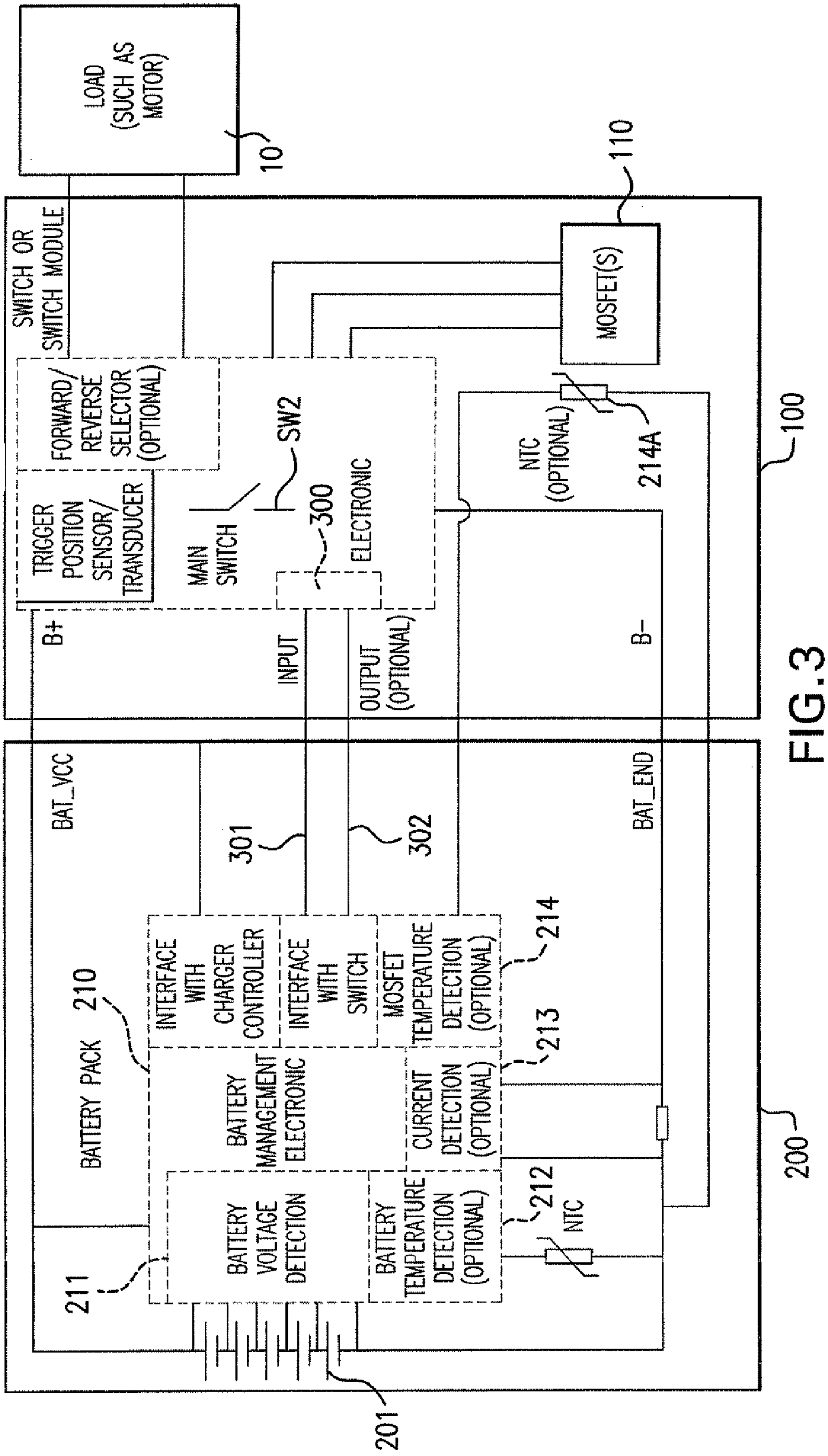
FIG. 3 is a functional block diagram of a first embodiment of an electrical appliance in accordance with the invention, which may be divided into a load control circuit and a battery circuit.
Figure 4:
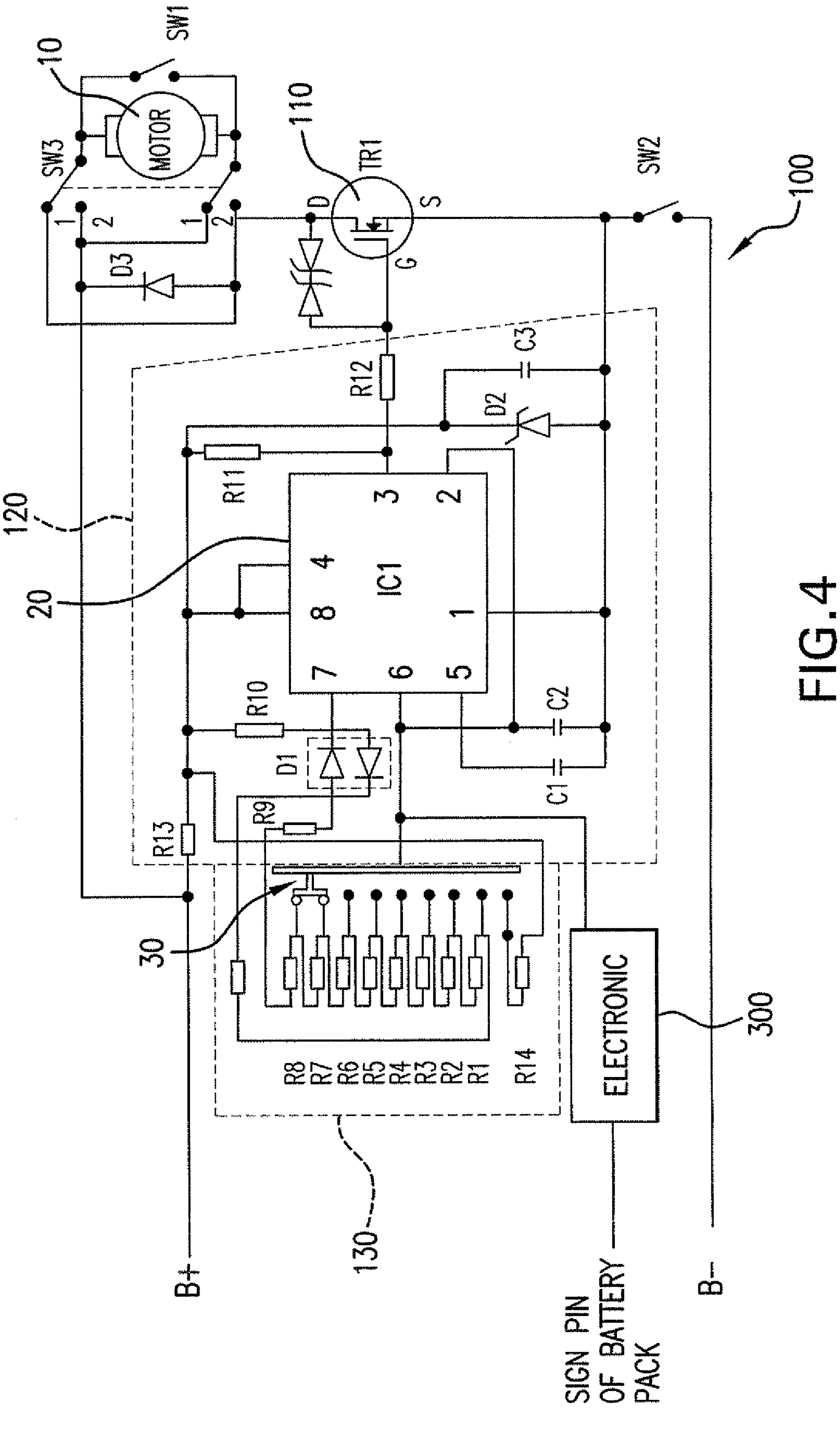
FIG. 4 is a circuit diagram of the load control circuit of FIG. 3.

At an intermediate trigger position, the moving contact 30, for example as shown in FIG. 4 short-circuiting the resistor R7, electrically divides the resistors R1 to R8 into a first series of resistors R8 and a second series of resistors R1 to R6.

In the direction along the path via the first resistor series R8 and one of the diodes D1, the capacitor C2 discharges into the discharge pin 7 of the IC CHIP 20, whereby a discharging condition appears at both input pins 2 and 6. Upon the capacitor C2 discharging to a voltage below one-third of Vcc as detected by one of the input pins 2 and 6, the output pin 3 changes from logic-low to logic-high to turn on the MOSFET 110, and the capacitor C2 enters the next charging period.

In the direction along the path via the other of the diodes D1 and the second resistor series R1 to R6, the capacitor C2 is charged, whereby a charging condition appears at both input pins 2 and 6. Upon the capacitor C2 being charged up to a voltage above two-thirds of Vcc as detected by the other of the input pins 2 and 6, the output pin 3 changes from logic-high to logic-low to turn off the MOSFET 110, and the capacitor C2 enters the next discharging period.

The discharging and charging periods of the capacitor C2 depend on the corresponding resultant resistances of the divided first and second series of resistors R1 to R8, which are in turn determined by the position of the moving contact 30 and hence the trigger position. The capacitor discharging and charging periods determine the mark-to-space ratio of the control signal at the output pin 3 of the IC CHIP 20 and in turn the root-mean-square value of the pulsating DC current that flows through the MOSFET 110 and drives the motor 10 at the desired speed/torque.

The battery pack 200 incorporates a series of Li-ion battery cells 201 for supplying electrical power to the motor 10 via the MOSFET 110 and the main switch SW2, etc. The battery pack 200 has a pair of terminals B+ and B− connected to the motor circuit as shown. Provided inside the battery pack 200 is a battery management/protection circuit 210 for the battery cells 201. The battery circuit 210 includes at least one detection circuit 211 for detecting an adverse operating condition of the battery cells 201 and then outputting a disabling signal at a sign pin of the battery pack 200 to indicate such an adverse operating condition.

The output signal from the electronic circuit 210 of the battery pack 200 controls the MOSFET 110 on the load side in the control/switching module 100. It will turn off the MOSFET 110 according to certain adverse conditions preset in the battery circuit 210.

The primary detection circuit is a battery voltage detection circuit 211 for detecting over-discharging of the battery cells 201. The voltage detection circuit 211 inputs the resultant voltage of the cells 201 via a potential divider 211A and then compares it with a reference voltage to determine whether or not the battery cells 201 are discharging at a voltage below a threshold voltage of, say, 3.0V per cell. Upon detecting an over-discharging condition, the detection circuit 211 will output a disabling signal via a transistor 219 at the sign pin, that being a logic-low signal.

The voltage detection may be implemented by using an op-amp comparator or an MCU (microprocessor control unit) that incorporates ADC (analogue-to-digital converter).

Examples of optional protective measures are a battery temperature detection circuit 212 that co-operates with an NTC thermistor 212A adjacent the cells 201 for monitoring their temperature, a current detection circuit 213 for detecting over-current from the cells 201, and a MOSFET temperature detection circuit 214 that co-operates with an NTC thermistor 214A next to the MOSFET 110 for checking its temperature. Any one of such detection circuits may trigger a said disabling signal.

As the battery management/protection circuit 210 is programmed to shut down or enter a standby mode for power saving, a wake-up (enabling) signal is needed. For this reason, the battery pack 200 includes a wake-up circuit 220 connected between the battery cells 201 and the battery circuit 210 for controlling battery/power connection to the battery circuit 210 based on the operation of the pull-trigger.

The wake-up circuit 220 is formed by a pair of switching transistors 221 and 222 which are arranged such that the first transistor 221 will, upon receiving a wake-up signal (logic-high) at its gate, conduct to turn on the second transistor 222, whose emitter-collector circuit extends from the positive terminal B+ of the battery cells 201 to the battery circuit 210.

Such a wake-up signal will be generated immediately when the main switch SW2 is closed to start the motor 110, i.e. upon start of operation of the subject drill. In response to the wake-up signal, the transistors 221 and 222 turn on and connect the battery cells 201 to the battery circuit 210 for operation. After the battery circuit 210 has become active, it keeps detecting the preset adverse conditions while enabling power supply to the motor 10 via the MOSFET 110 of the control/switch circuit 100 by not or without intervening the sign pin, i.e. letting it stay logic-high.

The battery pack 200 interacts with the control circuit 100 via an interface circuit 300 which serves to generate and transmit control signals in opposite directions, i.e. said disabling signal for switching off the MOSFET 110 and said wake-up signal for connecting the battery cells 201. The interface circuit 300 may be implemented as part of either the motor control circuit 100 (as in the case of the described embodiments) or the battery pack 200, and it includes either a single link 301/302 (as in the case of the present embodiment) or a pair of links (301' and 302' in the case of the later embodiment) that enters across the control circuit 100 and the battery pack 200.

Figure 8:
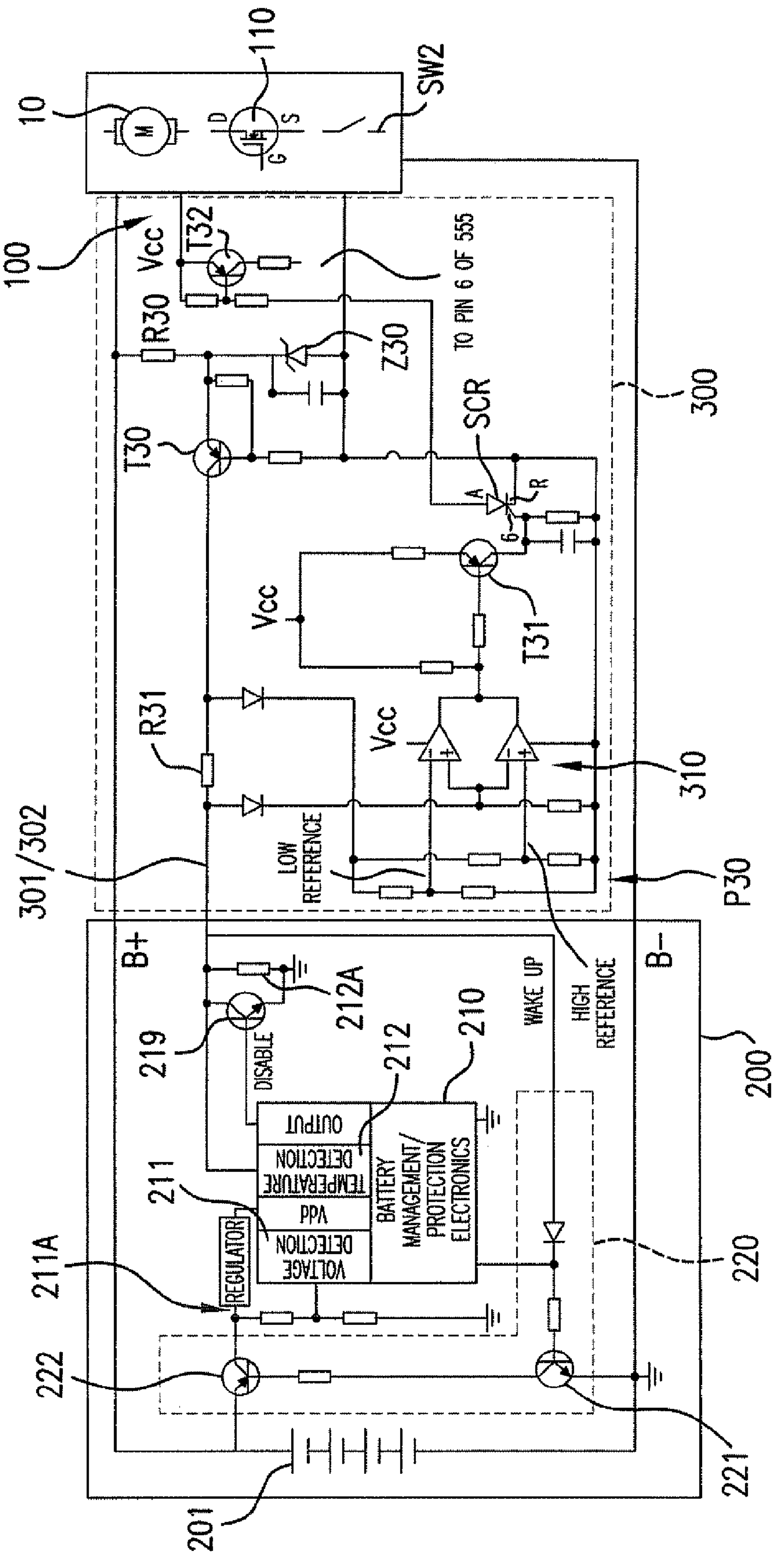
FIG. 8 is a circuit diagram corresponding to FIG. 7, which shows the battery circuit in detail.
Figure 9:
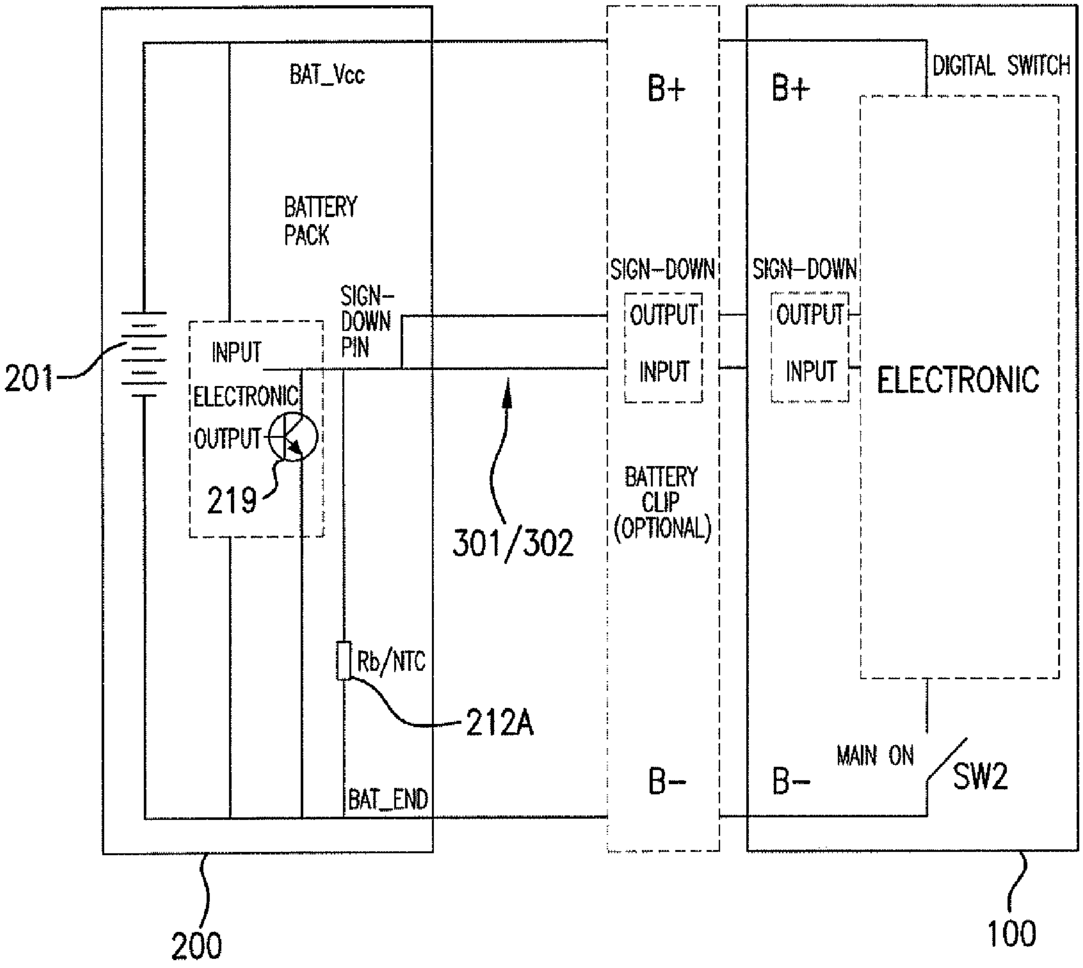
FIG. 9 is a schematic block diagram of the appliance of FIG. 8.

The interface circuit 300 is designed to co-operate with the wake-up circuit 220 and the battery voltage detection circuit 212, as shown in FIG. 8.

The wake-up circuit 220 is first referred to. At start of operation of the subject drill or the motor 10, closing of the main switch SW2 completes a circuit of the switch SW2 including a resistor R30 and zener diode Z30 of the interface circuit 300 (FIGS. 7 and 8), whereupon a transistor T30 conducts to provide a logic-high signal (as clamped by the zener diode Z30) as a wake-up signal along the link 301/302 to trigger the wake-up circuit 220.

The circuit formed by the main switch SW2, resistor R30, zener diode Z30 and transistor T30 functions as a sensing circuit for sensing the start of operation of the motor 10 and then providing a wake-up signal.

Referring to the battery voltage detection circuit 212, its associated thermistor 212A is connected across the link 301/302 and the ground for reflecting the battery temperature at the link 301/302. The interface circuit 300 includes a resistor R31 in the link 301/302 and a double op-amp voltage comparator 310. One end of the resistor R31 to the transistor T30 (at a voltage clamped by the zener diode Z30) is connected to two reference inputs of the comparator 310 via individual potential dividers P30 to provide respective low and high reference voltages. These reference voltages represent the minimum and maximum operating temperatures of the battery cells 201. The other end of the resistor R31 to the thermistor 212A (at a voltage reflecting the battery temperature) is connected to the remaining two inputs of the comparator 310 for comparison with the low and high reference voltages.

If the working temperature of the battery cells 201 departs from the operating range, the resulting change of voltage at the thermistor 212A represents a logic-low disabling signal appearing on the link 301/302. The output of the comparator 310 will then change from logic-high to logic-low to pass on the disabling signal. This will bring about turning on of a transistor T31 and in turn a silicon-controlled rectifier SCR and finally another transistor T32 to apply logic-high to pin 6 of the IC chip 20, whose pin 3 will then toggle to logic-low to turn off the MOSFET 110, thereby disconnecting the battery cells 201.

In general, a logic-high signal from the battery circuit 210 will turn on the MOSFET 110 in the control/switching circuit 100, whereas a logic-low signal will disable the MOSFET 110. This has an advantage over the reverse logic because a fault of open circuit could give a low signal to the MOSFET 110 and output to the load is prohibited.

It is noted that the single link 301/302 serves to transmit the wake-up signal in one direction from the control circuit 100 to the battery pack 200, and to transmit the disabling signal in the reversed direction.

Figure 10:
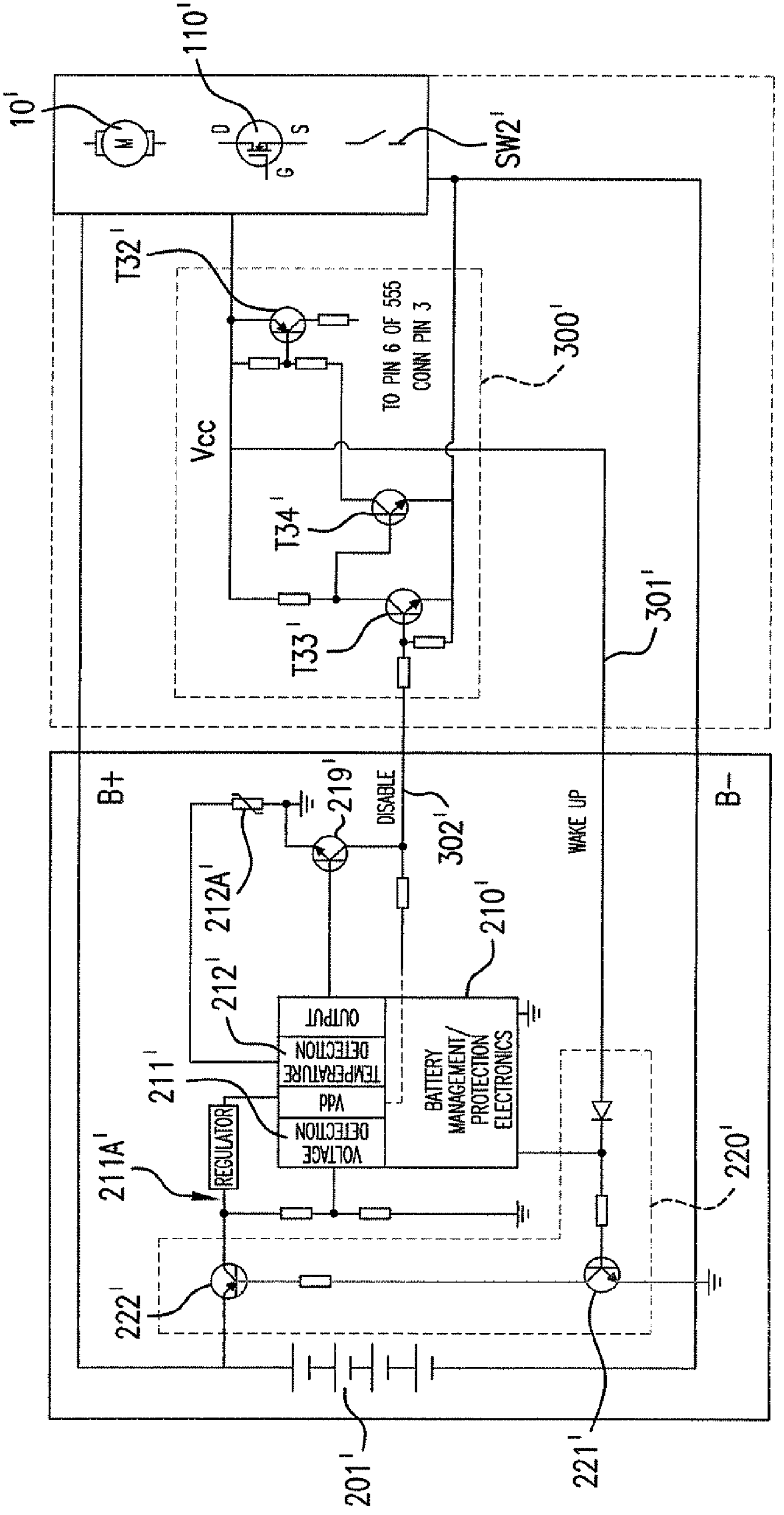
FIG. 10 is a circuit diagram of a second embodiment of an electrical appliance in accordance with the invention.
Figure 11:
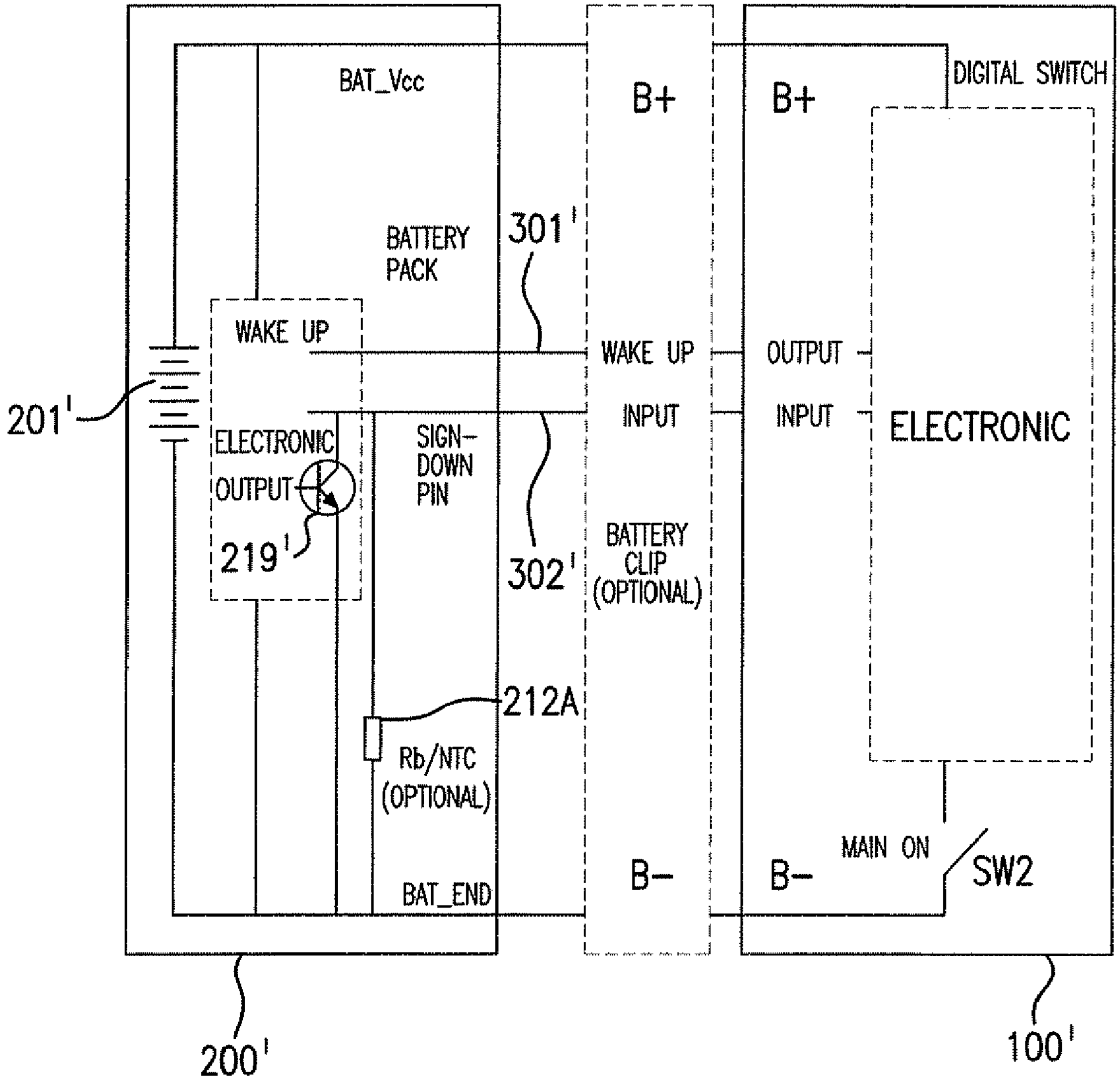
FIG. 11 is a schematic block diagram of the appliance of FIG. 10.

Reference is now made to FIGS. 10 and 11 of the drawings showing a second electrical appliance embodying the invention, which has generally the same circuit construction as the first electrical appliance and operates in generally the same way, with equivalent parts designated by the same reference numerals suffixed by an apostrophe sign, except the interface circuit 300'.

The interface circuit 300' incorporates a pair of links 301' and 302', rather than one as in the previous embodiment, for processing wake-up and disabling signals separately. The connection and operation of the link 301' for delivering wake-up signals remain the same as that of the previous link 301/302 insofar as wake-up signal is concerned, as shown and described in relation to FIG. 7. As is apparent from the foregoing description, transistor T32' (T32) determines the signal logic applied to pin 6 of the control IC chip 20', and hence pin 3 that directly controls the MOSFET 110'.

The other link 302' for disabling signals is connected to the transistor T32' via two switching transistors T33' and T34' connected for successive switching as shown. During normal operation of the motor 10', the link 302' is at logic-high and the transistors T33' and T34' are on and off respectively, resulting in an off state for the transistor T32' to apply logic-low to pin 6 the IC chip 20', whereby operation of the MOSFET 110' is not disturbed. An incoming disabling signal will pull high the link 302', whereupon the transistors T33', T34' and T32' will toggle one after another to apply logic-high to pin 6 the IC chip 20', thereby disabling the MOSFET 110'.

The battery pack/device of the electrical appliance of the subject invention does not incorporate any switching device (typically a solid-state transistor e.g. MOSFET) to control connection of the batteries for management or protection. The relevant switching action is re-assigned to the switching device on the load side that controls the load. There are advantages in avoiding the use of MOSFET within the battery pack, for example:

(i) Since the MOSFET is located remote from the battery pack, the heat of the MOSFET that can be transmitted to the batteries will be significantly reduced (ii) The cost of the battery pack can be greatly reduced as it no longer incorporates any built-in MOSFET The cost advantage will be more significant if the power tool or appliance is bundled with more than one battery pack.

It is envisaged that the subject electrical appliance may incorporate any kind of power driven load for performing a specific function, whether it be a power tool as described or any other types of equipment or device such as a flashlight. Also, the battery type is not limited to Li-ion, and different battery types require protection in different aspects as is known in the art.

The invention has been described by way of example only, and various other modifications of and/or alterations to the described embodiments may be made by persons skilled in the art without departing from the scope of the invention.

What is claimed is:

1. A battery powered electrical appliance comprising:

a rechargeable battery for supplying electrical power for operating the electrical appliance;

a battery circuit selectively connectable to the rechargeable battery and including an adverse condition detecting circuit for detecting an adverse operating condition of the rechargeable battery and generating a disable signal in response to detection of an adverse operating condition of the rechargeable battery;

a control circuit connected to an electrically driven load of the electrical appliance for controlling operation of the electrical appliance and sending an enable signal to the battery circuit to operate the electrical appliance; and an interface circuit interposed between and connecting the battery circuit and the control circuit to each other, a single link connecting the interface circuit to the battery circuit, the enable signal being forwarded to the battery circuit through the single link and the disable signal being forwarded to the interface circuit through the single link, the interface circuit generating a logic signal in response to receiving a disable signal and supplying the logic signal to the control circuit to stop operation of the electrical appliance, the interface circuit including first and second comparators, each comparator having a reference terminal and an input terminal, a first resistor connected in the single link, and a voltage divider connected between the single link, on a first side of the resistor, closer to the control circuit than to the battery circuit, and ground, supplying respective reference potentials to the reference terminals of the first and second comparators to establish an operating range for a detected operating condition of the rechargeable battery, wherein the input terminals of the first and second comparators are connected to the single link at a second side of the resistor, closer to the battery circuit than to the control circuit, for supplying the disable signal to the first and second comparators to generate the logic signal.

2. The battery powered electrical appliance according to claim 1 wherein the battery circuit includes a second resistor and first and second switches respectively connected to opposite ends of the second resistor, the switches being closed in response to sending of the enable signal, connecting the second resistor in parallel with the rechargeable battery to initiate power supply from the rechargeable battery to the electrical appliance and connecting the battery circuit to the rechargeable battery.

3. The battery powered electrical appliance according to claim 1 wherein the logic signal generated to stop operation of the electrical appliance is a high signal.

4. The battery powered electrical appliance according to claim 1 wherein the rechargeable battery comprises a lithium-ion battery.

5. The battery powered electrical appliance according to claim 4 wherein the battery circuit detects, as an adverse operating condition of the rechargeable battery, excessive discharging of the lithium-ion battery.

6. The battery powered electrical appliance according to claim 1 wherein the battery circuit detects, as an adverse operating condition of the rechargeable battery, excessive temperature of the rechargeable battery.

7. A battery powered electrical appliance comprising:

a rechargeable battery for supplying electrical power for operating the electrical appliance;

a battery circuit selectively connectable to the rechargeable battery and including an adverse condition detecting circuit for detecting an adverse operating condition of the rechargeable battery and generating a disable signal in response to detection of an adverse operating condition of the rechargeable battery;

a control circuit connected to an electrically driven load of the electrical appliance for controlling operation of the electrical appliance and sending an enable signal to the battery circuit to operate the electrical appliance; and an interface circuit interposed between and connecting the battery circuit and the control circuit to each other, a first link connecting the interface circuit to the battery circuit and a second link connecting the battery circuit to the interface circuit, the enable signal being forwarded to the battery circuit through the first link and the disable signal being forwarded to the interface circuit through the second link, the interface circuit generating a logic signal, in response to receiving a disable signal, and supplying the logic signal to the control circuit to stop operation of the electrical appliance, wherein the interface circuit includes first and second switching transistors connected for successive switching and for maintaining opposed on and off states, the first and second switching transistors, upon receiving the disable signal, changing states to generate the logic signal, and the battery circuit includes a resistor and first and second switches respectively connected to opposite ends of the resistor, the switches being closed in response to sending of the enable signal, connecting the resistor in parallel with the rechargeable battery to initiate power supply from the rechargeable battery to the electrical appliance and connecting the battery circuit to the rechargeable battery.

8. The battery powered electrical appliance according to claim 7 wherein the logic signal generated to stop operation of the electrical appliance is a high signal.

9. The battery powered electrical appliance according to claim 7 wherein the rechargeable battery comprises a lithium-ion battery.

10. The battery powered electrical appliance according to claim 9 wherein the battery circuit detects, as an adverse operating condition of the rechargeable battery, excessive discharging of the lithium-ion battery.

11. The battery powered electrical appliance according to claim 7 wherein the battery circuit detects, as an adverse operating condition of the rechargeable battery, excessive temperature of the rechargeable battery.

* * * * *